United States Patent
Ji et al.

(10) Patent No.: US 11,701,635 B2
(45) Date of Patent: *Jul. 18, 2023

(54) MATERIAL, FILTER, AND DEVICE FOR REMOVING CONTAMINANT

(71) Applicant: SAMSUNG ELECTRONICS CO., LTD., Suwon-si (KR)

(72) Inventors: Sangmin Ji, Yongin-si (KR); Hyun Chui Lee, Asan-si (KR); Hyukjae Kwon, Suwon-si (KR); Dongsik Yang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 233 days.

This patent is subject to a terminal disclaimer.

(21) Appl. No.: 17/032,185

(22) Filed: Sep. 25, 2020

(65) Prior Publication Data

US 2021/0252475 A1    Aug. 19, 2021

(30) Foreign Application Priority Data

Feb. 19, 2020 (KR) .................. 10-2020-0020546

(51) Int. Cl.
  *B01J 20/20* (2006.01)
  *B01D 46/00* (2022.01)
  *B01D 46/42* (2006.01)
  *B01D 53/02* (2006.01)
  *B01J 20/06* (2006.01)
  *B01J 20/28* (2006.01)

(52) U.S. Cl.
  CPC .......... *B01J 20/20* (2013.01); *B01D 46/0036* (2013.01); *B01D 46/4263* (2013.01); *B01D 53/02* (2013.01); *B01J 20/06* (2013.01); *B01J 20/2808* (2013.01); *B01J 20/28019* (2013.01); *B01J 20/28083* (2013.01); *B01J 20/28085* (2013.01); *B01D 2253/102* (2013.01); *B01D 2253/1124* (2013.01)

(58) Field of Classification Search
  CPC ...... B01J 20/20; B01J 20/06; B01J 20/28019; B01J 20/2808; B01J 20/28083; B01J 20/28085; B01D 46/0036; B01D 46/4263; B01D 53/02; B01D 2253/102; B01D 2253/1124
  USPC ........................................................ 502/417
  See application file for complete search history.

(56) References Cited

U.S. PATENT DOCUMENTS

| | | | |
|---|---|---|---|
| 7,607,294 B2 | 10/2009 | Son | |
| 7,795,173 B2 | 9/2010 | Vanderspurt et al. | |
| 8,961,895 B2 | 2/2015 | Freedman et al. | |
| 10,538,434 B2 | 1/2020 | Takeuchi et al. | |
| 10,842,905 B2 | 11/2020 | Baek | |
| 2001/0022290 A1 | 9/2001 | Shiota et al. | |
| 2014/0060400 A1 | 3/2014 | Park et al. | |
| 2015/0118138 A1 | 4/2015 | Jung et al. | |
| 2021/0094026 A1* | 4/2021 | Kwon | ............. B01D 53/8687 |

FOREIGN PATENT DOCUMENTS

| | | |
|---|---|---|
| CN | 103908972 A | 7/2014 |
| CN | 103920509 B | 12/2015 |
| CN | 104785280 A | 9/2017 |
| CN | 107262121 A | 10/2017 |
| EP | 0715878 A1 | 6/1996 |
| JP | 1999033344 A | 2/1999 |
| JP | 4345363 B2 | 10/2009 |
| KR | 19960010047 A | 4/1996 |
| KR | 1020040063390 A | 7/2004 |
| KR | 1020050064697 A | 6/2005 |
| KR | 1020060115939 A | 11/2006 |
| KR | 101339919 B1 | 12/2013 |
| KR | 101435587 B1 | 8/2014 |
| KR | 1020150050479 A | 5/2015 |
| KR | 1020150056498 A | 5/2015 |
| KR | 101740281 B1 | 5/2017 |
| KR | 101853757 B1 | 5/2018 |
| KR | 1020190024390 A | 3/2019 |

OTHER PUBLICATIONS

Chi-Yuan Lu et al. "Simultaneous removal of VOC and NO by activated carbon impregnated with transition metal catalysts in combustion flue gas," Fuel Processing Technology, Elsevier BV, May 7, 2007, pp. 557-567, vol. 88, No. 6.
Extended EP Search Report dated Aug. 3, 2021 of EP Patent Application No. 21156211.1.
Fei Tian et al. "Photodegradation of formaldehyde by activated carbon loading TiO2 synthesized via microwave irradiation", Korean Journal of Chemical Engineering, Springer New York LLC, Feb. 23, 2015, pp. 1333-1339, vol. 32, No. 7.
Zhen-Shu Liu et al. "Activated carbon fibers impregnated with Pd and Pt catalysts for toluene removal," Journal of Hazardous Materials, Elsevier, Apr. 21, 2013, pp. 49-55, vol. 256.
Notice of Allowance dated Jul. 7, 2022 in U.S. Appl. No. 17/038,105.

* cited by examiner

*Primary Examiner* — Edward M Johnson
(74) *Attorney, Agent, or Firm* — Cantor Colburn LLP

(57) ABSTRACT

A material for removing a contaminant, the material including an adsorption material for adsorption of a contaminant and a decomposition material for decomposition of a contaminant, wherein the adsorption material and the decomposition material are complexed with each other, and a contaminant decomposition onset temperature of the decomposition material is equal to or lower than a contaminant desorption onset temperature of the adsorption material.

20 Claims, 3 Drawing Sheets

MATERIAL, FILTER, AND DEVICE FOR REMOVING CONTAMINANT

CROSS-REFERENCE TO RELATED APPLICATION

This application claims priority to and the benefit of Korean Patent Application No. 10-2020-0020546, filed on Feb. 19, 2020, in the Korean Intellectual Property Office, and all the benefits accruing therefrom under 35 U.S.C. § 119, the content of which in its entirety is herein incorporated by reference.

BACKGROUND

1. Field

The present disclosure relates to materials for removing contaminants, filters for removing contaminants including the materials, and devices for removing contaminants including the filters.

2. Description of Related Art

Environmental and health problems caused by an increase of various contaminants in the air may be solved by removing contaminants to purify the air.

To remove contaminants from the air, an adsorption removal method, a thermal oxidation method, a catalytic oxidation method, or the like may be used. The adsorption removal method may be uneconomical in that filter replacement, filter regeneration, or a combination thereof may be required upon saturation of contaminants adsorbed to an adsorbent. In addition, secondary contamination may occur when there is no additional means to prevent secondary contamination in which contaminants adsorbed to an adsorbent are desorbed and re-released into the air during filter replacement, filter regeneration, or a combination thereof. Meanwhile, the thermal oxidation method or the catalytic oxidation method may be limited and uneconomical in removing contaminants in terms of, for example, maintaining a high-temperature (e.g., 200° C. or higher) to remove contaminants.

Accordingly, desired is development a material for removing contaminants, the material effectively preventing secondary contamination, and at the same time, having ease of use and economic efficiency.

SUMMARY

Provided are materials for removing contaminants, the materials effectively preventing secondary contamination, and at the same time, having ease of use and economic efficiency, filters including the materials for removing contaminants, and devices including the filters for removing contaminants.

Additional aspects will be set forth in part in the description which follows and, in part, will be apparent from the description, or may be learned by practice of the presented embodiments of the disclosure.

According to an embodiment,
a material for removing a contaminant includes a material for adsorption of a contaminant and a material for decomposition of a contaminant,
wherein the material for adsorption of a contaminant and the material for decomposition of a contaminant are complexed with each other, and
a decomposition onset temperature of the material for decomposition of a contaminant is equal to or lower than a desorption onset temperature of the material for adsorption of a contaminant.

According to an embodiment,
a filter for removing a contaminant includes: the material for removing a contaminant; and
a heating tool for transferring heat to the material for decomposition of a contaminant in the material for removing a contaminant.

According to an embodiment, a device for removing a contaminant includes the filter.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
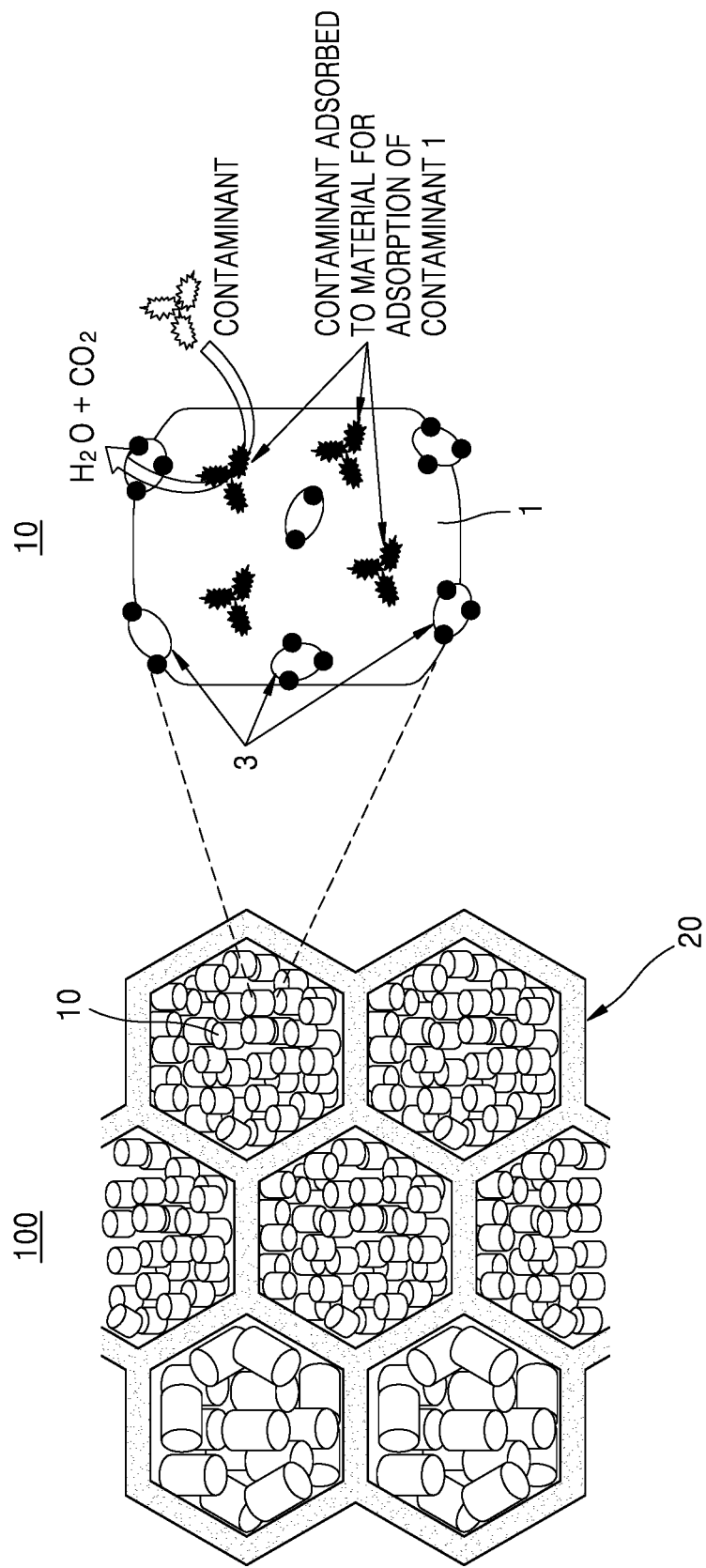
FIG. 1 is an enlarged schematic view of an embodiment of a material for removing a contaminant 10 and a filter for removing a contaminant 100.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third" etc. may be used herein to describe various elements and/or components, these elements and/or components should not be limited by these terms. These terms are only used to distinguish one element or component from another element or component. Thus, "a first element" or "component" discussed below could be termed a second element or component without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "Group" as used herein refers to a group of the Periodic Table of Elements defined according to the IUPAC 1-18 classification system.

The term "alkoxide" as used herein refers to a compound having an alkoxy group, wherein the alkoxy group corresponds to an alkyl moiety (i.e., —O-alkyl) linked via oxygen. The alkoxy group may include 1 to 30 carbon atoms, and examples of such a $C_1$-$C_{30}$ alkoxy group include a methoxy group, an ethoxy group, a propoxy group, an isobutoxy group, a sec-butoxy group, a pentoxy group, an iso-amyloxy group, and a hexyloxy group.

The term "acetate" as used herein refers to a salt obtained by a reaction of acetic acid with a given compound.

The phrase "decomposition onset temperature" as used herein refers to a minimum temperature at which a contaminant is decomposed by contact with a material for decomposition of a contaminant, which may also be referred to as a decomposition material.

The phrase "desorption onset temperature" as used herein refers to a minimum temperature at which a contaminant is desorbed from a material for adsorption of a contaminant, which may also be referred to as an adsorption material.

FIG. 1 is an enlarged schematic view of a material for removing a contaminant 10 and a filter for removing a contaminant 100 according to an embodiment. Hereinafter, by referring to FIG. 1, the material for removing a contaminant 10 and the filter for removing a contaminant 100 will be described in detail.

In FIG. 1, the material for removing a contaminant 10 includes a material for adsorption of a contaminant 1 and a material for decomposition of a contaminant 3.

The contaminant may be, for example, a harmful substance in the air. For example, the contaminant may be a volatile organic compound (VOC), such as toluene, formaldehyde, phenol, butanol, siloxane, and the like; ammonia ($NH_3$), an oxide of nitrogen (N), sulfur (S), silicon (Si), or a combination thereof; various odors; fine dust; a germ; or a combination thereof.

The material for adsorption of a contaminant 1 may include carbon (C).

For example, the material for adsorption of a contaminant 1 may include activated carbon, carbon fibers (e.g., activated carbon fibers, carbon nanofibers, and the like), carbon rods (e.g., carbon nanorods and the like), graphene, a porous carbon-based compound, or a combination thereof.

In an embodiment, the material for adsorption of a contaminant 1 may include an oxide. Such an oxide may have a crystalline structure or an amorphous structure.

For example, the material for adsorption of a contaminant 1 may include an oxide, but in an embodiment the oxide may not be an oxide of boron (B), C, N, S, or a combination thereof.

In an embodiment, the material for adsorption of a contaminant 1 may include an oxide of an element of Group 4 (e.g., titanium (Ti), zirconium (Zr), hafnium (Hf), and the like), an element of Group 5 (e.g., vanadium (V), niobium (Nb), tantalum (Ta), and the like), an element of Group 6 (e.g., chromium (Cr), molybdenum (Mo), tungsten (W), and the like), an element of Group 7 (e.g., manganese (Mn) and the like), an element of Group 8 (e.g., iron (Fe), ruthenium (Ru), osmium (Os), and the like), an element of Group 9 (e.g., cobalt (Co) and the like), an element of Group 10 (e.g., nickel (Ni) and the like), an element of Group 11 (e.g., copper (Cu), silver (Ag), gold (Au), and the like), an element of Group 12 (e.g., zinc (Zn) and the like), a lanthanide element (e.g., cerium (Ce) and the like), aluminum (Al), gallium (Ga), indium (In), thallium (Tl), silicon (Si), germanium (Ge), tin (Sn), lead (Pb), phosphorus (P), arsenic (As), antimony (Sb), bismuth (Bi), magnesium (Mg), or a combination thereof.

In an embodiment, the material for adsorption of a contaminant 1 may include: $TiO_2$, $SiO_2$, $ZnO$, $Ce_xZr_{1-x}O_2$ (wherein $0 \le x \le 1$), $SiO_2$—$Al_2O_3$, $SiO_2$—$ZrO_2$, $Al_2O_3$—$ZrO_2$, or $CeO$—$ZrO_2$; a porous metal-organic framework (MOF) including a metal, such as Zn, Fe, Co, Cr, Ni, Al, Mg, and the like; or a combination thereof.

In an embodiment, the material for adsorption of a contaminant 1 may include an oxide, and the oxide included herein may further include an oxygen defect-inducing atom for inducing an oxygen defect in an oxide framework, wherein the oxygen defect-inducing atom may include Ti, V, Cr, Mn, Fe, Co, Ni, Cu, Zn, Ga, Ge, Zr, Nb, Ru, rhodium (Rh), palladium (Pd), Ag, cadmium (Cd), In, Sn, Ta, W, iridium (Ir), platinum (Pt), Au, Pb, Bi, or a combination thereof.

The oxygen defect-inducing atom induces local imbalance of electron bonding in the material for adsorption of a contaminant 1 to form a partial oxygen vacancy or defect, thereby facilitating adsorption of an oxygen atom to the material for adsorption of a contaminant 1. At the same time, the generation of active oxygen may be additionally induced, so that the oxygen defect-inducing atom may serve to further improve a contaminant decomposition efficiency of the material for decomposition of a contaminant 3.

The material for adsorption of a contaminant 1 may have various forms. For example, the material for adsorption of a contaminant 1 may have a particle form, such as a spherical particle, a tubular particle, a rod-shaped particle, a fibrous particle, or a plate-shaped particle. The material for adsorption of a contaminant 1 may have a form, such as powder, granule, pellet, and the like, in which a plurality of particles are processed.

The material for adsorption of a contaminant 1 may be a porous material. For example, the material for adsorption of a contaminant 1 may be a porous material including micropores of 2 nanometers (nm) or less, mesopores of 2 nm to 50 nm, macropores of 50 nm or greater, or a combination thereof. The term "pore" as used herein refers to, for example, a maximum average diameter. Thus, the material for adsorption of a contaminant 1 may have a relatively large surface area and a relatively large pore area. For example, the mesopore may have a surface area of 20 m$^2$/g or greater, for example, in a range of about 40 m$^2$/g to about 900 m$^2$/g or about 80 m$^2$/g to about 800 m$^2$/g.

The material for decomposition of a contaminant 3 may be any suitable material capable of decomposing a contaminant. For example, the material for decomposition of a contaminant 3 may be any suitable material capable of decomposing a contaminant by an oxidative decomposition reaction (for example, see Reaction Formula 1):

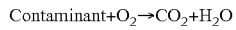

Contaminant+O$_2$→CO$_2$+H$_2$O             Reaction Formula 1

In an embodiment, the material for decomposition of a contaminant 3 may include a metal, a metal oxide, or a combination thereof. For example, the metal or the metal oxide may include a transition metal, a lanthanide metal, or a combination thereof. In an embodiment, the metal and the metal oxide may each independently include a transition metal, a lanthanide metal, or a combination thereof. In an embodiment, the metal or the metal oxide may include an element of Group 4, an element of Group 5, an element of Group 6, an element of Group 7, an element of Group 8, an element of Group 9, an element of Group 10, an element of Group 11, a lanthanide element, or a combination thereof. In an embodiment, the metal and the metal oxide may each independently include an element of Group 4, an element of Group 5, an element of Group 6, an element of Group 7, an element of Group 8, an element of Group 9, an element of Group 10, an element of Group 11, a lanthanide element, or a combination thereof. In an embodiment, the metal or the metal oxide may include Ti, Pt, Pd, Ru, Rh, Ni, Cu, Ag, Au, Mn, Ce, or a combination thereof. In an embodiment, the metal and the metal oxide may each independently include Ti, Pt, Pd, Ru, Rh, Ni, Cu, Ag, Au, Mn, Ce, or a combination thereof.

In an embodiment, the material for decomposition of a contaminant 3 may include the metal, the metal oxide, or a combination thereof, wherein the metal or the metal oxide may each include a combination of two or more metals that are different from each other (for example, a combination of Pt and Mn) or wherein the metal and the metal oxide may each independently include a combination of two or more metals that are different from each other (for example, a combination of Pt and Mn).

The material for decomposition of a contaminant 3 may be a spherical particle.

For example, the material for decomposition of a contaminant 3 may be a spherical particle having a particle diameter (D50) in a range of about 1 nm to about 500 nm.

In the material for removing a contaminant 10, the material for adsorption of a contaminant 1 and the material for decomposition of a contaminant 3 may be complexed with each other. For example, in the material for removing a contaminant 10, the material for adsorption of a contaminant 1 and the material for decomposition of a contaminant 3 may be physically coupled to each other, chemically coupled to each other, or physically and chemically coupled to each other.

In an embodiment, the material for decomposition of a contaminant 3 may be supported on a surface of the material for adsorption of a contaminant 1 (for example, an inner surface of the material for adsorption of a contaminant 1, an outer surface of the material for adsorption of a contaminant 1, or an inner surface and an outer surface of the material for adsorption of a contaminant 1).

In an embodiment, the material for decomposition of a contaminant 3 may be inserted in the framework of the material for adsorption of a contaminant 1, substituted in the framework of the material for adsorption of a contaminant 1, or inserted and substituted in the framework of the material for adsorption of a contaminant 1.

In the material for removing a contaminant 10, an amount of the material for decomposition of a contaminant 3 may be in a range of about 0.1 part by weight to about 50 parts by weight, per 100 parts by weight of the material for adsorption of a contaminant 1.

The structure of the material for removing a contaminant 10 may be identical to or very similar to the structure of the material for adsorption of a contaminant 1.

For example, the material for removing a contaminant 10 may be a spherical particle, a tubular particle, a rod-shaped particle, a fibrous particle, or a plate-shaped particle, and may be a porous material (for example, a porous material including micropores of 2 nm or less, mesopores in a range of about 2 nm to about 50 nm, macropores of 50 nm or greater, or a combination thereof).

In the material for removing a contaminant 10, a contaminant decomposition onset temperature of the material for decomposition of a contaminant 3 may be equal to or lower than a contaminant desorption onset temperature of the material for adsorption of a contaminant 1.

In an embodiment, the contaminant decomposition onset temperature of the material for decomposition of a contaminant 3 may be equal to the contaminant desorption onset temperature of the material for adsorption of a contaminant 1, or may be lower than the contaminant desorption onset temperature of the material for adsorption of a contaminant 1 by a range of about 1° C. to about 80° C., about 10° C. to about 70° C., about 20° C. to about 60° C., or about 30° C. to about 50° C. For example, the contaminant decomposition onset temperature of the material for decomposition of a contaminant 3 may be lower than the contaminant desorption onset temperature of the material for adsorption of a contaminant 1 by 40° C.

In an embodiment, the contaminant decomposition onset temperature of the material for decomposition of a contaminant 3 may be in a range of about 100° C. to about 160° C., about 105° C. to about 150° C., about 110° C. to about 140° C., or about 115° C. to about 135° C. For example, the contaminant decomposition onset temperature of the material for decomposition of a contaminant 3 may be about 125° C.

In an embodiment, the contaminant desorption onset temperature of the material for adsorption of a contaminant 1 may be in a range of about 120° C. to about 200° C., about 130° C. to about 190° C., about 140° C. to about 185° C., or about 150° C. to about 180° C. For example, the contaminant desorption onset temperature of the material for adsorption of a contaminant 1 may be about 165° C.

In the material for removing a contaminant 10, the contaminant decomposition onset temperature of the material for decomposition of a contaminant 3 is equal to or lower than the contaminant desorption onset temperature of the material for adsorption of a contaminant 1, the material for removing a contaminant 10 may be regenerated (i.e., the contaminant adsorbed to the material for adsorption of a contaminant 1 in the material for removing a contaminant 10 is removed so that the material for removing a contaminant 10 is ready to reuse) while the secondary contamination in which the contaminant adsorbed to the material for adsorption of a contaminant 1 in the material for removing a contaminant 10 is not decomposed but desorbed and re-released into the air is substantially prevented, without operating, e.g., using, the material for removing a contaminant 10 at a high temperature, e.g., at a consistently high temperature.

For example, under <Condition 1> in which an operation temperature (e.g., room temperature) is lower than the contaminant decomposition onset temperature of the material for decomposition of a contaminant 3, a user may operate, e.g., use, the material for removing a contaminant 10, so as to remove the contaminant in the air. Regarding <Condition 1>, the contaminant may be adsorbed to the material for adsorption of a contaminant 1 in the material for removing a contaminant 10, and accordingly, the air including the contaminant may be purified.

When <Condition 1> is maintained, the concentration of the contaminant adsorbed to the material for adsorption of a contaminant 1 is saturated, and accordingly, the removal of the contaminant in the air by the material for adsorption of a contaminant 1 may no longer be effectively achieved. In this case, under <Condition 2> in which an operation temperature is higher than the contaminant decomposition onset temperature of the material for decomposition of a contaminant 3, a user may operate, e.g., use, the material for removing a contaminant 10, so as to decompose the contaminant adsorbed to the material for removing a contaminant 10 into water and carbon dioxide. Taking into consideration that the contaminant decomposition onset temperature of the material for decomposition of a contaminant 3 is equal to or lower than the contaminant desorption onset temperature of the material for adsorption of a contaminant 1 (i.e., the contaminant desorption onset temperature of the material for adsorption of a contaminant 1 is equal to or higher than the contaminant decomposition onset temperature of the material for decomposition of a contaminant 3), the contaminant is not desorbed from the material for adsorption of a contaminant 1, but is still adsorbed thereto. Thus, the secondary contamination in which the contaminant adsorbed to the material for adsorption of a contaminant 1 is not decomposed but is desorbed and re-released into the air may be substantially prevented, and accordingly, the material for removing a contaminant 10 may be regenerated.

When the concentration of the contaminant in the air is relatively small, a user may alternately choose <Condition 1> and <Condition 2>. However, when the concentration of the contaminant in the air is relatively high so that fast removal of the contaminant is desired, a user may choose <Condition 2> for a short time. As such, a user may not operate, e.g., use, the material for removing a contaminant 10 at a high temperature, e.g., at a consistently high temperature. In addition, when <Condition 2> is chosen, the material for removing a contaminant 10 may be effectively regenerated without causing the secondary contamination, so that the replacement cycle of the filter for removing a contaminant 100 may be lengthened.

Therefore, by using the material for removing a contaminant 10, the filter for removing a contaminant 100 effectively preventing the secondary contamination and simultaneously having ease of use and economic efficiency and a device including the filter for removing a contaminant may be implemented.

The material for removing a contaminant 10 may be manufactured by using methods known in the art.

For example, the material for removing a contaminant 10 may be manufactured by using various methods, such as Evaporation-Induced Self-Assembly or Co-Precipitation.

In an embodiment, a method of manufacturing the material for removing a contaminant 10 includes:

preparing a first mixture by mixing i) the material for adsorption of a contaminant 1, a precursor of the material for decomposition of a contaminant 3, and a solvent; or ii) a precursor of the material for adsorption of a contaminant 1, a precursor of the material for decomposition of a contaminant 3, and a solvent; and performing heat treatment on the first mixture.

The material for adsorption of a contaminant 1 may be understood as described throughout the specification.

The precursor of the material for adsorption of a contaminant 1 may include, for example, an alkoxide, a halide, a nitrite, a hydrochloride, a sulfate, and an acetate, of an element of Group 4, an element of Group 5, an element of Group 6, an element of Group 7, an element of Group 8, an element of Group 9, an element of Group 10, an element of Group 11, an element of Group 12, a lanthanide element, Al, Ga, In, Tl, Si, Ge, Sn, Pb, P, As, Sb, Bi, Mg, C, or a combination thereof.

The precursor of the material for decomposition of a contaminant 3 may include, for example, an alkoxide, a halide, a nitrite, a hydrochloride, a sulfate, and an acetate, of a transition metal (e.g., Pt, Pd, Ru, Rh, and the like), a lanthanide metal, or a combination thereof. In an embodiment, the precursor of the material for decomposition of a contaminant 3 may include an alkoxide, a halide, a nitrite, a hydrochloride, a sulfate and an acetate, of an element of Group 4, an element of Group 5, an element of Group 6, an element of Group 7, an element of Group 8, an element of Group 9, an element of Group 10, an element of Group 11, a lanthanide element, or a combination thereof.

The solvent may include an alcohol-based solvent, such as methanol, ethanol, and the like. The solvent may further include, in addition to the alcohol-based solvent, acid, such as a hydrochloric acid aqueous solution, an acetic acid aqueous solution, and the like. An amount of the solvent may be in a range of about 0.1 part by weight to about 40 parts by weight, 0.5 part by weight to about 35 parts by weight, or 1 part by weight to about 30 parts by weight, based on 100 parts by weight of the total amount of the precursor of the material for adsorption of a contaminant 1 (or, the material for adsorption of a contaminant 1) and the precursor of the material for decomposition of a contaminant 3.

The first mixture may further include a structure inducer. The structure inducer may serve to more effectively induce the porous structure of the material for adsorption of a contaminant 1. For example, the structure inducer may include a neutral surfactant. For example, for use as the neutral surfactant, a polyethylene oxide (PEO)/polypropylene oxide (PPO)/polyethylene oxide (PEO) tri-block copolymer known as Pluronic F108, F127 (manufactured by BASF Company) may be used.

The first mixture in which the above-mentioned substances are mixed may be stirred, for example, at room temperature for about 0.1 hour to about 72 hours, about 0.1 hour to about 48 hours, about 0.1 hour to about 24 hours, about 1 hour to about 8 hours, or about 5 hours, so that each substance may be formed homogeneously in the solvent.

In an embodiment, before the performing of the heat treatment on the first mixture, optionally, the first mixture may be additionally left to stand in an opened state at room temperature (e.g., about 10° C. to about 30° C., or about 20° C.) and at an atmospheric pressure (e.g., about 50 kPa to about 101 kPa or about 75 kPa to about 100 kPa) for about 1 hour to about 100 hours (e.g., 2 hours to about 90 hours or about 4 hours to about 80 hours), so as to remove a volatile solvent substance from the first mixture. In an embodiment, to remove the volatile solvent substance more rapidly, the first mixture may be additionally left to stand at a relatively high temperature (e.g., about 10° C. to about 100° C.) and at a reduced pressure (e.g., about 10 mbar to about 1 bar) for about 1 hour to about 100 hours (e.g., about 2 hours to about 90 hours or about 4 hours to about 80 hours), so as to remove the volatile solvent substance from the first mixture.

In an embodiment, before the performing of the heat treatment on the first mixture, optionally, to improve the degree of bonding between atoms forming the material for adsorption of a contaminant 1, the first mixture may be additionally aged in the atmosphere for about 6 hours to about 48 hours (e.g., about 8 hours to about 36 hours or about 10 hours to about 24 hours) at a raised temperature in a range of about 30° C. to about 100° C. (e.g., about 40° C. to about 90° C. or about 50° C. to about 80° C.).

Subsequently, the first mixture may be subjected to calcination, i.e., heat treatment. During the heat treatment, at least a portion of each precursor may be converted into an oxide, a mesoporous structure may be formed, or a combination thereof. The heat treatment may be performed in the atmosphere at a temperature in a range of about 300° C. to about 1,000° C. (e.g., about 350° C. to about 600° C. or about 400° C. to about 500° C.) for about 0.1 hour to about 30 hours (e.g., about 1 hour to about 10 hours or about 2 hours to about 8 hours).

In an embodiment, a method of manufacturing the material for removing a contaminant 10 includes:
preparing a water-dispersion by mixing i) the material for adsorption of a contaminant 1, the precursor of the material for decomposition of a contaminant 3, and water; or ii) the precursor of the material for adsorption of a contaminant 1, the precursor of the material for decomposition of a contaminant 3, and water; and
obtaining a filtrate by forming a precipitate from the water-dispersion and filtering the precipitate; and performing heat treatment on the filtrate.

The material for removing a contaminant 10 may be used for the filter for removing a contaminant 100. The filter for removing a contaminant 100 may include the material for removing a contaminant 10 and a heating tool 20 for transferring heat to the material for decomposition of a contaminant 3 in the material for removing a contaminant 10.

The material for removing a contaminant 10 may be understood as described throughout the specification.

The heating tool 20 may serve to transfer heat to the material for decomposition of a contaminant 3, when the material for removing a contaminant 10 is operated under <Condition 2> described above.

The heating tool 20 may include a heating element and a sensor for measuring a temperature.

The filter for removing a contaminant 100 may be used in various devices for removing contaminants. Therefore, provided is a device for removing a contaminant including the filter 100.

In an embodiment, such a device for removing a contaminant may further include any suitable tool capable of transferring the contaminant-containing air to the filter for removing a contaminant 100.

In an embodiment, the device for removing a contaminant may further include a sensor for measuring a concentration of a contaminant adsorbed on, e.g., to, the material for adsorption of a contaminant 1 of the filter for removing a contaminant 100. By using the sensor for measuring the concentration of the contaminant, a concentration of the contaminant in the contaminant-containing air before passing through the filter for removing a contaminant 100 and a concentration of the contaminant in the contaminant-containing air after passing through the filter for removing a contaminant 100 are measured, and the difference between these two concentrations is calculated, thereby evaluating the concentration of the contaminant adsorbed to the material for adsorption of a contaminant 1.

Hereinafter, the configuration and effect of the present disclosure will be described in detail with reference to specific Examples and Comparative Examples. Examples are, however, provided only to more clearly understand the present disclosure, and are not intended to limit the scope of the present disclosure.

EXAMPLES

Evaluation 1: Evaluation of Desorption Onset Temperature of Toluene

A toluene desorption onset temperature of Adsorbent 1 was evaluated by injecting a certain amount (125 milliliters per minute (mL/min), 70 parts per million (ppm)) of toluene gas sample to a reactor including Adsorbent 1 (1.0 grams (g)) and measuring a concentration (ppm) of toluene desorbed from Adsorbent 1 while a temperature of the reactor was raised from room temperature (25° C.) to 300° C. at a constant speed (1.5 degrees per minute (° C./min)), based on a Temperature-Programmed Desorption (TPD) method. By repeating the same process for Adsorbent A, the toluene desorption onset temperatures of each of Adsorbents 1 and A were measured, and results are summarized in Table 1:

TABLE 1

| | Adsorbent | Toluene desorption onset temperature (° C.) |
|---|---|---|
| Adsorbent 1 | Activated carbon (AC) (ECOSORB-IAC-900, manufactured by ECOPRO Company) | 165 |
| Adsorbent A | Ketjen black (KB) (Ketjenblack EC 300 J, manufactured by Mitsubishi Chemical Company) | 100 |

Example 1: Preparation of Purifier 1 (1 Weight Percent (wt %) Pt and 10 wt % Mn/AC)

Ethanol: 20 milliliters (mL)
Distilled water: 20 mL
AC: 2 g (Adsorbent 1)
Pt precursor ($H_2PtCl_6 \cdot H_2O$): 0.05 g (1 wt %)
Mn precursor ($Mn(NO_3)_2 \cdot H_2O$): 1.54 g (10 wt %)

A Pt precursor, a Mn precursor, ethanol, and distilled water were put in a 500 mL round-bottom flask, and the mixed solution was stirred at room temperature for 1 hour. Then, AC was added thereto, and the resulting solution was stirred at room temperature for 2 hours. Afterwards, the round-bottom flask was heated up to 353 K, and dried for 3 hours after the internal pressure was reduced to 100 millibars (mbar). The resultant obtained therefrom was heat-treated at 473 K for 4 hours under a hydrogen gas ($H_2$) atmosphere, so as to prepare Purifier 1 (i.e., a purifier in which Adsorbent 1 and Decomposer 1 (a composite of Pt (1 wt %) and Mn (10 wt %)) were complexed with each other).

Comparative Example A: Preparation of Purifier A
(1 wt % Pt and 10 wt % Mn/KB)

Ethanol: 20 mL

Distilled water: 20 mL

KB: 2 g (Adsorbent A)

Pt precursor ($H_2PtCl_6 \cdot H_2O$): 0.05 g (1 wt %)

Mn precursor ($Mn(NO_3)_2 \cdot H_2O$): 1.54 g (10 wt %)

Purifier A (i.e., a purifier in which Adsorbent A and Decomposer 1 (a composite of Pt (1 wt %) and Mn (10 wt %)) were complexed with each other) was prepared in the same manner as in Example 1, except that Adsorbent A (KB) was used instead of Adsorbent 1 (AC).

Evaluation 2: Evaluation of Toluene Decomposition Onset Temperature

A toluene decomposition onset temperature of Decomposer 1 was evaluated by injecting a certain amount (125 mL/min, 70 ppm) of toluene gas sample to a reactor including Decomposer 1 (1.0 g) and measuring a temperature at which carbon dioxide, which is a decomposition product of toluene was, generated while a temperature of the reactor was raised from room temperature (25° C.) to 300° C. at a constant speed (1.5° C./min), based on TPR (Temperature-Programmed Reaction) method.

TABLE 2

| | Decomposer | Toluene decomposition onset temperature (° C.) |
|---|---|---|
| Decomposer 1 | Decomposers of Example 1 and Comparative Example A | 125 |

Evaluation Example 3: Evaluation of Toluene Removal Performance

Figure 2:
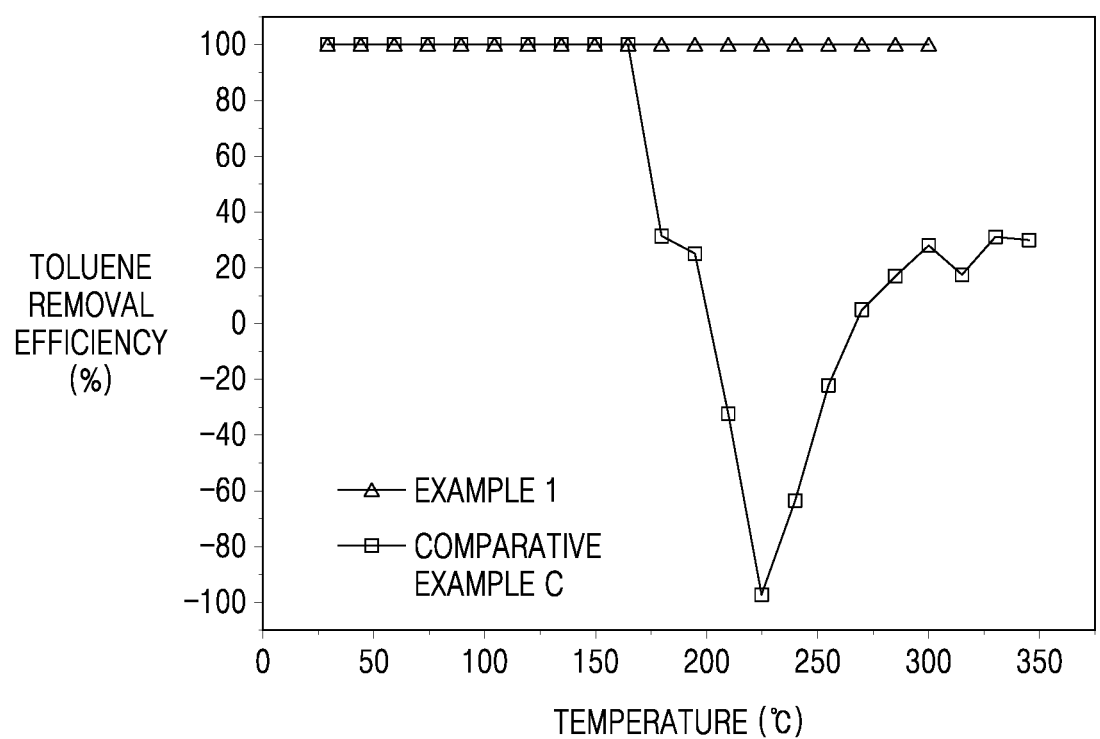
FIG. 2 is a graph showing toluene removal efficiency (%) versus temperature (° C.) of each of Example 1 and Comparative Example C.
Figure 3:
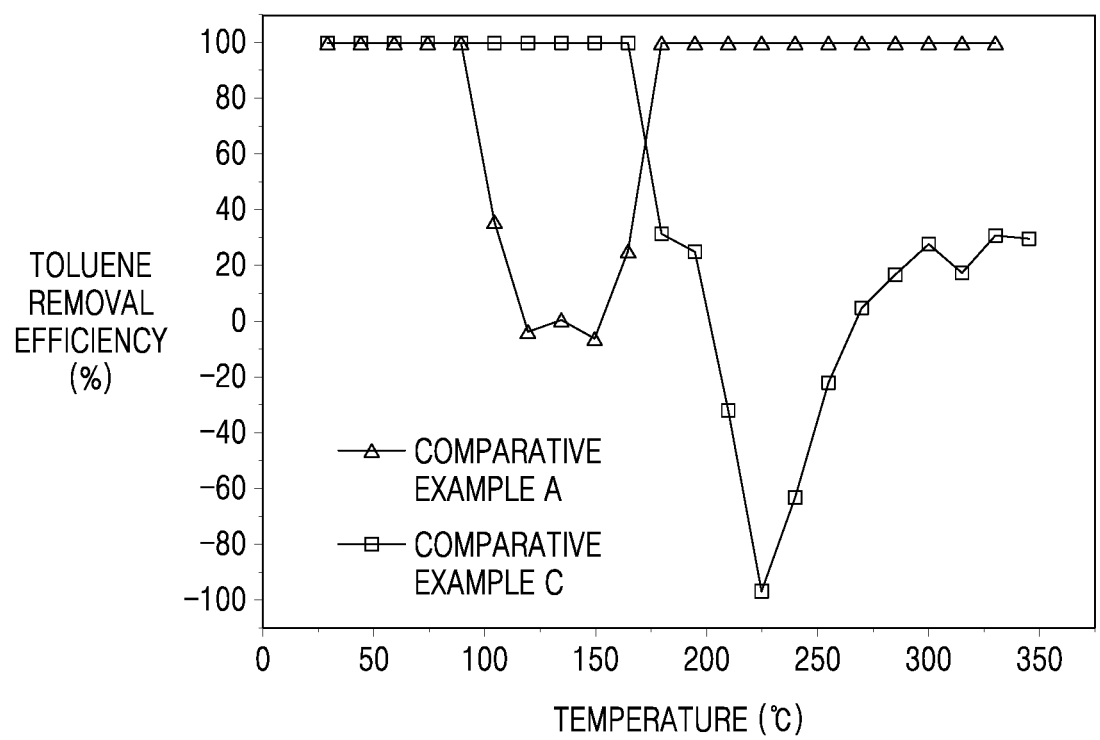
FIG. 3 is a graph showing toluene removal efficiency (%) versus temperature (° C.) of each of Comparative Examples A and C.

For each of Example 1 (Purifier 1), Comparative Example A (Purifier A), and Comparative Example C (Adsorbent 1) shown in Table 3, the toluene removal performance at each temperature was evaluated according to a method for measuring an initial concentration reduction amount by using a continuous heating reactor, and results are shown in FIGS. 2 and 3. The initial concentration of toluene in the continuous heating reactor was 70 ppm, and the gas hourly space velocity (GHSV, a value of a toluene flow rate per time divided by a volume of a corresponding material) for each material was adjusted to be 30,000 $h^{-1}$. The toluene removal efficiency (%) was evaluated by Equation 1 below:

((Initial concentration of toluene−concentration of discharged toluene)/initial concentration of toluene)*100  Equation 1

TABLE 3

| | Purifier | Adsorbent | Toluene desorption onset temperature of Adsorbent (° C.) | Decomposer | Toluene decomposition onset temperature of Decomposer (° C.) |
|---|---|---|---|---|---|
| Example 1 | Purifier 1 | Adsorbent 1 | 165 | Decomposer 1 | 125 |
| Comparative Example A | Purifier A | Adsorbent A | 100 | Decomposer 1 | 125 |
| Comparative Example C | — | Adsorbent 1 | 165 | — | — |

FIG. 2 is a graph showing temperature (° C.) dependent toluene removal efficiency (%) of each of Example 1 and Comparative Example C, and FIG. 3 is a graph showing temperature (° C.) dependent toluene removal efficiency (%) of each of Comparative Examples A and C. Referring to FIGS. 2 and 3, it was confirmed that, in Comparative Example C not including a decomposer, the toluene removal efficiency was significantly decreased over a temperature of 165° C. of higher which is the toluene desorption onset temperature of Adsorbent 1. In addition, it was confirmed that, in Comparative Example A in which the toluene decomposition onset temperature of Decomposer 1 was higher than the toluene desorption onset temperature of Adsorbent A, the toluene removal efficiency of was significantly decreased over a temperature of 100° C. which is the toluene desorption onset temperature of Adsorbent A, and that, in Example 1 in which the toluene decomposition onset temperature of Decomposer 1 was lower than the toluene desorption onset temperature of Adsorbent 1, the toluene removal efficiency was excellent over all temperature ranges.

Accordingly, it was confirmed that Purifier 1 of Example 1 effectively prevented the secondary contamination and simultaneously was easy to use and provided economic efficiency, without operating the purifier at a high temperature, e.g., at a consistently high temperature.

According to an embodiment, a material for removing a contaminant may effectively prevent secondary contamination, and at the same time, may have ease of use and economic efficiency. In this regard, a filter for removing a contaminant including the material and a device for removing a contaminant including the filter may be used to remove a contaminant with high efficiency and low cost.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A material for removing a contaminant, the material comprising
an adsorption material for adsorption of the contaminant and
a decomposition material for decomposition of the contaminant, wherein the adsorption material and the decomposition material are complexed with each other, and a contaminant decomposition onset temperature of the decomposition material is equal to or lower than a contaminant desorption onset temperature of the adsorption material.

2. The material of claim 1, wherein the adsorption material comprises carbon.

3. The material of claim 2, wherein the adsorption material comprises activated carbon, carbon fibers, carbon rods, graphene, a porous carbon-based compound, or a combination thereof.

4. The material of claim 1, wherein the adsorption material comprises an oxide.

5. The material of claim 1, wherein the adsorption material comprises an oxide of an element of Group 4, an element of Group 5, an element of Group 6, an element of Group 7, an element of Group 8, an element of Group 9, an element of Group 10, an element of Group 11, an element of Group 12, a lanthanide element, aluminum, gallium, indium, thallium, silicon, germanium, tin, lead, phosphorus, arsenic, antimony, bismuth, magnesium, or a combination thereof.

6. The material of claim 1, wherein the adsorption material is a spherical particle, a tubular particle, a rod-shaped particle, a fibrous particle, or a plate-shaped particle.

7. The material of claim 1, wherein the adsorption material is a porous material.

8. The material of claim 1, wherein the adsorption material is a porous material comprising micropores of 2 nanometers or less, mesopores in a range of 2 nanometers to about 50 nanometers, macropores of 50 nanometers or greater, or a combination thereof.

9. The material of claim 1, wherein the decomposition material comprises a metal, a metal oxide, or a combination thereof, and the metal, the metal oxide, or the combination thereof comprises a transition metal, a lanthanide metal, or a combination thereof.

10. The material of claim 9, wherein the metal, the metal oxide, or the combination thereof comprises an element of Group 4, an element of Group 5, an element of Group 6, an element of Group 7, an element of Group 8, an element of Group 9, an element of Group 10, an element of Group 11, a lanthanide element, or a combination thereof.

11. The material of claim 9, wherein
the decomposition material comprises a metal and a metal oxide, and
the metal and the metal oxide each comprise two or more metals that are different from each other.

12. The material of claim 1, wherein the decomposition material is a spherical particle, and
a D50 particle diameter of the decomposition material is in a range of 1 nanometer to 500 nanometers.

13. The material of claim 1, wherein the decomposition material is supported on a surface of the adsorption material.

14. The material of claim 1, wherein an amount of the decomposition material is in a range of 0.1 parts by weight to 50 parts by weight, per 100 parts by weight of the adsorption material.

15. The material of claim 1, wherein the contaminant decomposition onset temperature of the decomposition material is equal to the contaminant desorption onset temperature of the adsorption material, or is lower than the contaminant desorption onset temperature of the adsorption material by 1° C. to 80° C.

16. The material of claim 1, wherein the contaminant decomposition onset temperature of the decomposition material is in a range of 100° C. to 160° C., and
the contaminant desorption onset temperature of the adsorption material is in a range of 120° C. to 200° C.

17. A filter for removing a contaminant, the filter comprising:
the material of claim 1; and
a heating tool for transferring heat to the decomposition material in the material.

18. The filter of claim 17, wherein the heating tool comprises a heating element and a sensor for measuring a temperature.

19. A device for removing a contaminant, the device comprising a filter for removing the contaminant, the filter comprising:
the material of claim 1; and
a heating tool for transferring heat to the decomposition material in the material.

20. The device of claim 19, wherein the device further comprises a sensor for measuring a concentration of the contaminant to measure a concentration of the contaminant adsorbed to the adsorption material in the filter.

* * * * *